(No Model.) 2 Sheets—Sheet 1.

W. E. HARMON & J. L. GARWOOD.
DRAFT ATTACHMENT.

No. 534,645. Patented Feb. 26, 1895.

Witnesses
John Skinner
Horace G. Seitz

Inventors
Wm E. Harmon
John L. Garwood
by
J F Beale
Attorney (No Model.) 2 Sheets—Sheet 2.
W. E. HARMON & J. L. GARWOOD.
DRAFT ATTACHMENT.
No. 534,645. Patented Feb. 26, 1895.
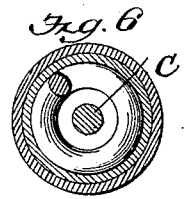
Fig. 6
Fig. 7
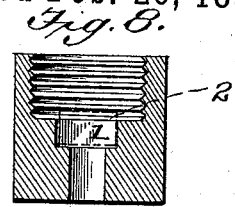
Fig. 8
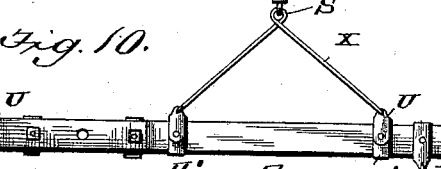
Fig. 9
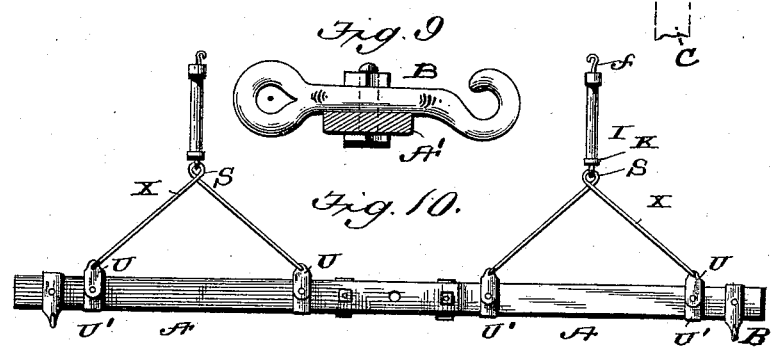
Fig. 10
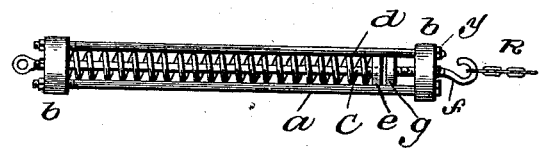
Fig. 11
Fig. 13
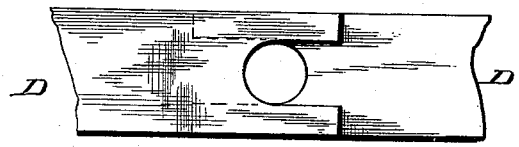
Fig. 12
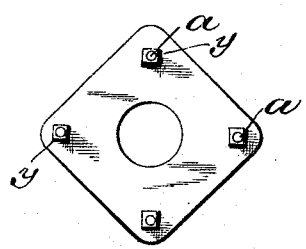
Witnesses
Inventors
Wm. E. Harmon
John L. Garwood
by
J. F. Beale
Attorney

UNITED STATES PATENT OFFICE.

WILLIAM ELLIS HARMON AND JOHN L. GARWOOD, OF HOUSTON, TEXAS.

DRAFT ATTACHMENT.

SPECIFICATION forming part of Letters Patent No. 534,645, dated February 26, 1895.

Application filed July 11, 1894. Serial No. 517,241. (No model.)

*To all whom it may concern:*

Be it known that we, WILLIAM ELLIS HARMON and JOHN L. GARWOOD, citizens of the United States, residing at Houston, in the county of Harris and State of Texas, have invented certain new and useful Improvements in Draft Attachments; and we do hereby declare the following to be a full, clear, and exact description of the invention, such as will enable others skilled in the art to which it appertains to make and use the same.

Our invention relates to draft attachments for vehicles.

The object of our invention is to provide an improved construction for draft attachments whereby we may dispense with the action of the ordinary doubletree or evener and throw the draft of each animal directly upon the axle-clips or fixed point of attachment on its side of the axle, thereby causing the draft of each animal to be independent of the other and avoid the tendency of the stronger, or in starting the quicker animal, pulling the weaker or slower animal backward and to one side of the line of draft.

It is also our object to provide a double tree made in two sections, each section operating independently of the other when disconnected and provided with means for uniting said sections to form thereof a rigid double tree.

It is also our object to provide an adjustable spring connection between the draft animal and the axle-clips or other fixed points of attachment to the vehicle whereby we diminish the swaying of the pole or tongue and avoid the jar upon horse and vehicle incident upon a sudden start or a rough road way.

Figure 1:
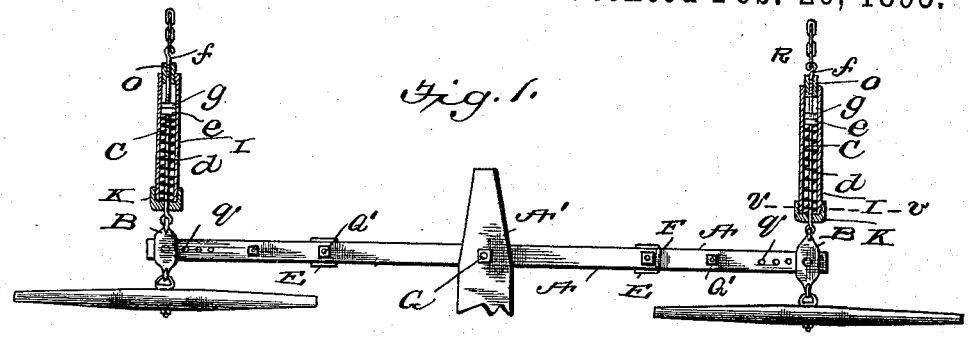
Figure 2:
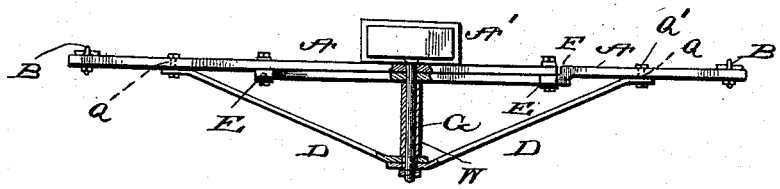

In the accompanying drawings forming a part of this specification Figure 1 is a top plan view; Fig. 2, a front elevation partly in section. Figs. 4, 5, 6, 7, 8, and 9, are detail views and Figs. 3, 10, 11, 12, and 13 show modifications.

Referring more particularly to the drawings A' denotes the pole.

A A denote swinging arms pivoted on the double-tree bolt G. Said bolt is of the usual construction being threaded and provided with nuts. Said arms are pivoted at a point about one-third of their length from their inner ends to the bolt G and are held in position by suitable nuts and washers as shown in Fig. 2.

E E denote clasps perforated and provided with screw bolts and nuts and secured to the inner ends of the arms A A and also at a point on said arms equi-distant from, and on the other side of their pivoted point, or at a point which will cause the perforations or bolt holes of the clasp on the inner end of the other arm to register when the two are straightened or are parallel. Said arms are perforated to admit the bolts of said clasps, and they are also perforated at Q and $q\ q\ q$.

B B denote clevises secured to the outer ends of the arms A A by screw threaded bolts and nuts as shown in Fig. 9 and consist of metal plates terminating in a hook at one end to which is secured the single tree, the other end terminating in an eye which engages the hooked end of the draw bar C. The center of said plate is perforated to receive a screw threaded bolt which secures it to the outer end of the arms A A and is held in place by a nut. Said clevises may be adjusted by means of the perforations $q\ q\ q$ inwardly or outwardly to suit the length of single tree used.

Figure 5:
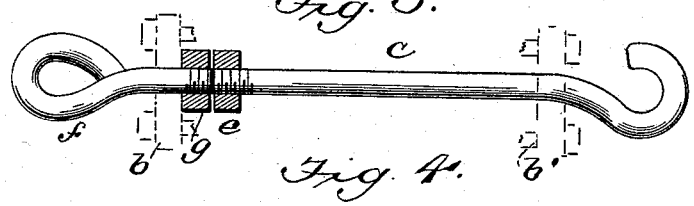

C denotes the draw bar terminating in a hook at one end and screw threaded at the other end to receive a nut $e$ as shown in Fig. 5. In the same figure in juxtaposition is shown an eye bolt and screw threaded to enter a female thread in face plate $b$ and provided with a nut $g$ at its end which bears against said nut $e$.

As shown in Fig. 2 J denotes an off set in one of the arms A A and serves to place the outer ends of said arms in the same horizontal plane and throw the draft in a like plane to each side of the axle.

Figure 4:
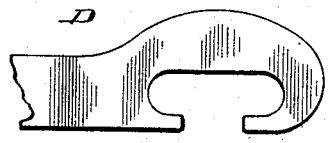

D D denote braces their ends being flattened or straightened the ends pivoted to double tree bolt having a slotted yoke as shown in Fig. 4. Fig. 13 shows a modification of this connection providing an open yoke instead. Either construction greatly facilitates the attachment and removal of the parts.

W denotes a sleeve which fits over the bolt G and serves to separate the arms A A and the braces D D.

Q' Q' denote headed bolts screw threaded to receive nuts and serve to clamp the braces to the arms A A. Said arms and braces being pivoted to the bolt G swing together, and as the braces are fastened to the arms outside of their points of union, the braces serve not only to strengthen the arms when acting independently but also to strengthen the double tree when the arms are united to form a rigid double tree. To produce the latter effect the arms are straightened and the clasps E are bolted together. Washers may be used with all nuts securing the arms and braces.

In Fig. 10 we show a plan view of our draft attachment for use on vehicles where the front axles are of narrow gage. The swinging arms A A are stayed from below by the braces D D as shown in Fig. 2.

X X denote two arms formed of a metal rod bent and crossed as shown in Fig. 10 to form an eye S. The ends of each arm terminate in a hook which engages with staples U formed integral with plates U' bolted to the swinging arms A A. The draft animals are attached to the clevises B, and the draft is communicated to the draw bar attached to the eye S formed at the intersection of the arms X X.

R R denote stay chains shown in Figs. 1 and 11 attached through the medium of our spring draft attachment to the clevises on the ends of the arms A A. Said figures illustrate different means for applying this feature of our invention. The draw bars and coiled springs are the same in each but the manner of inclosing the springs and arrangement of the draw bars and fastenings are different. Either method may be used.

In Fig. 12 we use two face plates b b a plan of which is shown in the drawings through which are inserted four bolts a a a a secured by nuts y y y y. Inclosed by these bolts is the spiral spring d through which is threaded the draw bar C and which passes through the perforation in the center of the face plate b'. Riveted to the inner end of the draw bar is a nut e against which the inner end of the coiled spring presses, the other end of the spring bearing against the face plate b.

g denotes a nut abutting the nut e and into which is screwed the eye-bolt f. Said eye-bolt passes through a screw threaded perforation in the center of the face plate b, one end being inclosed by the four bolts a a a a while the other or projecting end is attached to a chain R which is of the proper length to reach the axle-clips or other fixed point of attachment to the vehicle. Said eye-bolt is screw threaded to engage with the thread cut in said face plate b. The outer end of the draw bar is attached to the clevis either by hook or eye preferably by an eye.

It will be noticed that by screwing in on the eye-bolt f, the inner end of the same will press the nut g to the nut e thereby moving forward the draw-bar and compressing the coiled spring. By this means said spring may be stiffened or regulated to the proper tension for heavy or light draft. It will also be noticed that when the draft is applied to the clevis it is communicated by the draw-bar to the coiled spring thus affording a yielding connection between the draft animals and the fixed point of attachment to the vehicle.

In Fig. 1 we use the same kind of eye-bolts, draw-bars, coiled spring and attachments to the stay-chains and clevises s shown in Fig. 11, but we dispense with the use of the bolts a a a a and the face plates b b' and use instead the tube j which is preferably made of wrought iron piping and the cap K and lug O. The cap K is screw threaded upon its inner wall to receive the forward end of the tube I. Said cap is perforated at the center of its crown to admit the passage of the draw-bar. The rear end of said tube has a screw thread cut upon its interior wall which engages a male thread cut on the eye-bolt N. A cap similar to K may be used instead of the lug O and screwed to the outside of the tube I, and in this instance the perforation in the crown of the cap would be threaded to engage the thread on the eye-bolt and may be countersunk to receive the nut into which the eye-bolt would also screw as shown in Fig. 8 in which 1 denotes the countersink which receives the nut 2 and prevents it from turning. Fig. 7 gives a cross section of this plan.

Fig. 6 shows a plan view in cross section taken on the line v v of Fig. 1 showing the arrangement where the cap and lug are used. Said caps instead of having a rounded outer surface could be squared to admit of the use of a wrench in securing them to the tube I.

Figure 3:
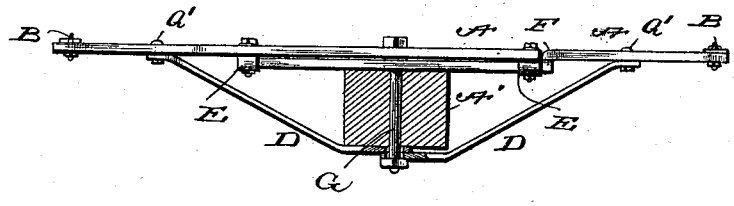

It will be seen from the construction shown in Fig. 3 that the tongue is interposed between the arms and braces and occupies the vertical space assigned to the sleeve W. Said sleeve is only used where the arms are swung beneath the tongue, or in case the ordinary doubletree is so swung.

Having shown and described our invention, what we claim, and desire to secure by Letters Patent, is—

1. In a yielding draft attachment the combination of the doubletree composed of two independently swinging arms pivoted to the doubletree bolt, and means for uniting said arms to form a rigid doubletree.

2. In a yielding draft attachment the combination of the doubletree composed of two independently swinging arms pivoted to the doubletree bolt, means for uniting said arms to form a rigid doubletree, and the arms x. x. attached to said swinging arms whereby said doubletree may be applied at axles of narrow gage.

3. In a yielding draft attachment the combination of the face plates, the bolts a connecting said plates and inclosing the draw bar and coiled spring, and the adjustable eye bolt for regulating the tension of said spring substantially as shown and described.

In testimony whereof we affix our signatures in presence of two witnesses.

WILLIAM ELLIS HARMON.
JOHN L. GARWOOD.

Witnesses:
J. W. WARD,
G. ST. C. HUSSEY.